April 28, 1942. W. H. BASELT 2,280,781
RAILWAY BRAKE
Filed Sept. 8, 1939 3 Sheets-Sheet 1
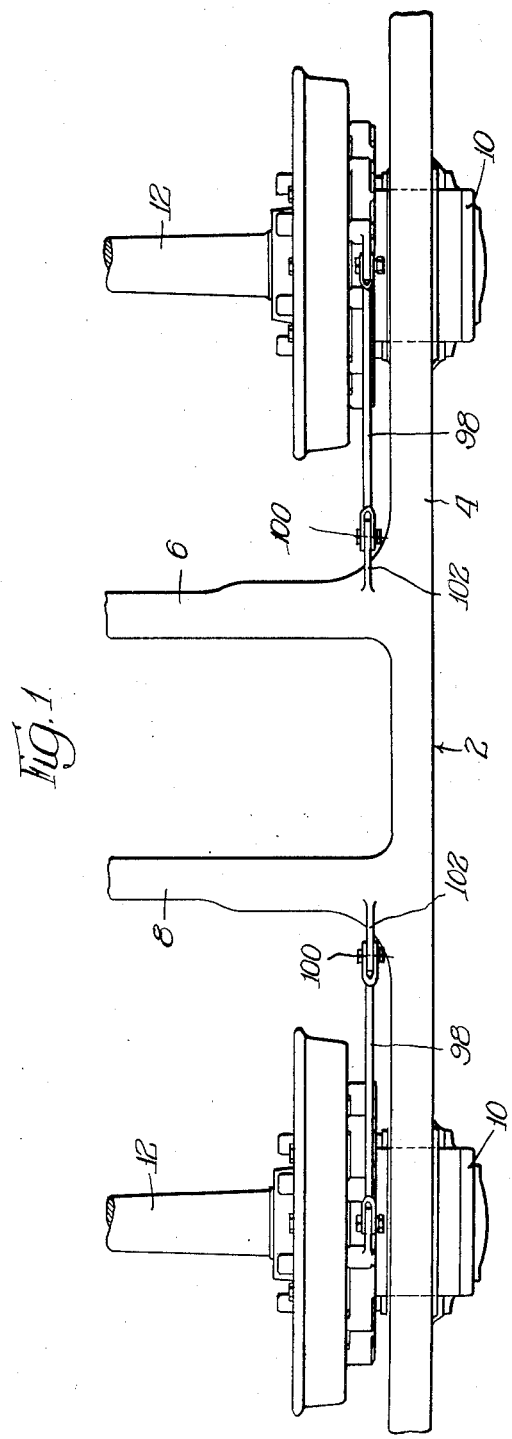
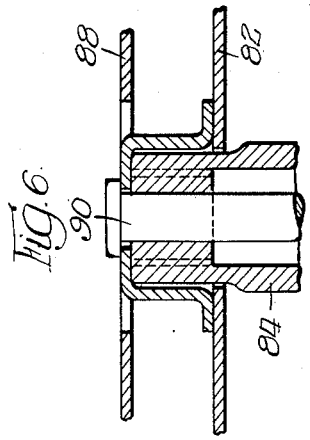
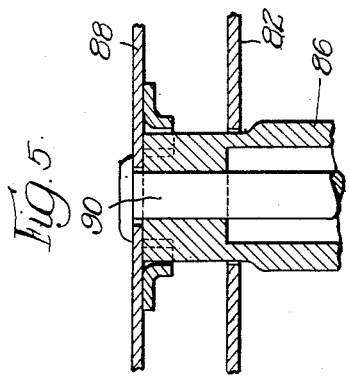
INVENTOR.
Walter H. Baselt,
BY
ATTORNEY.

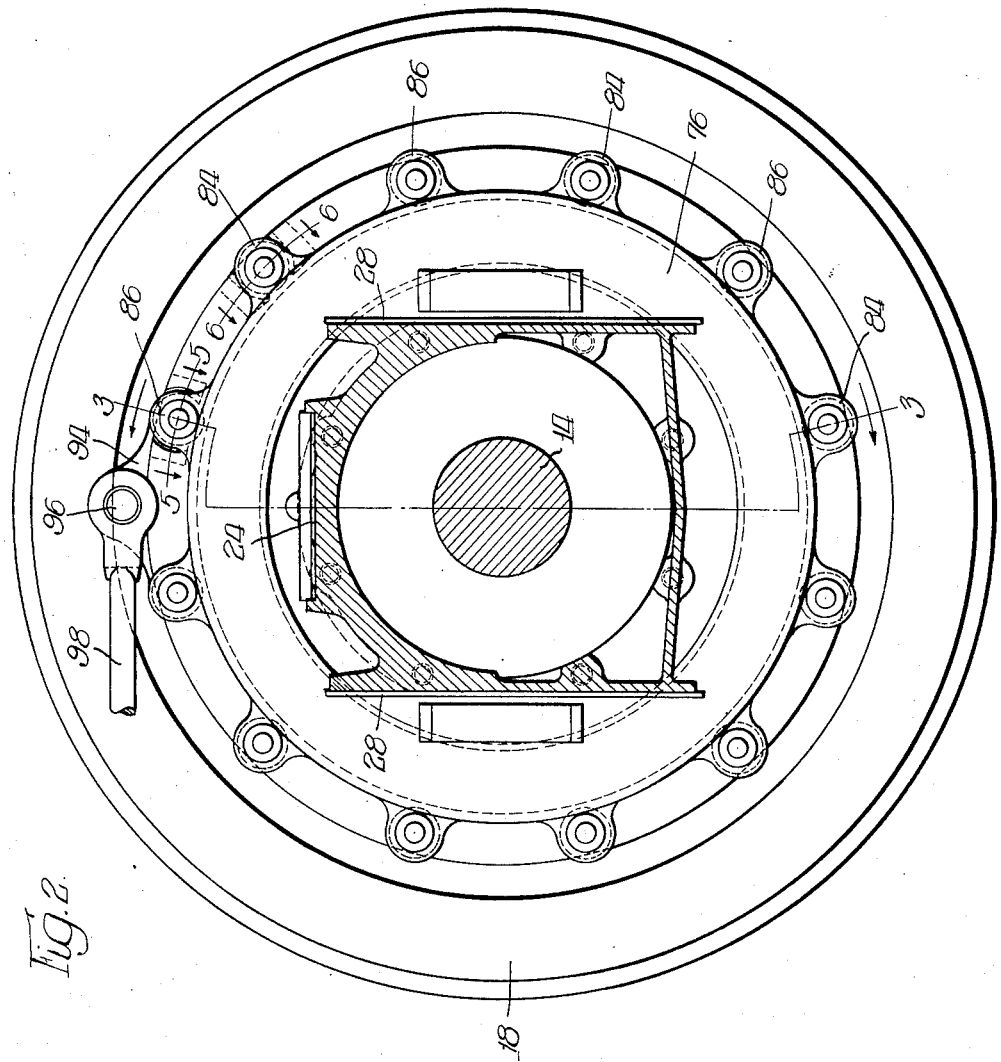

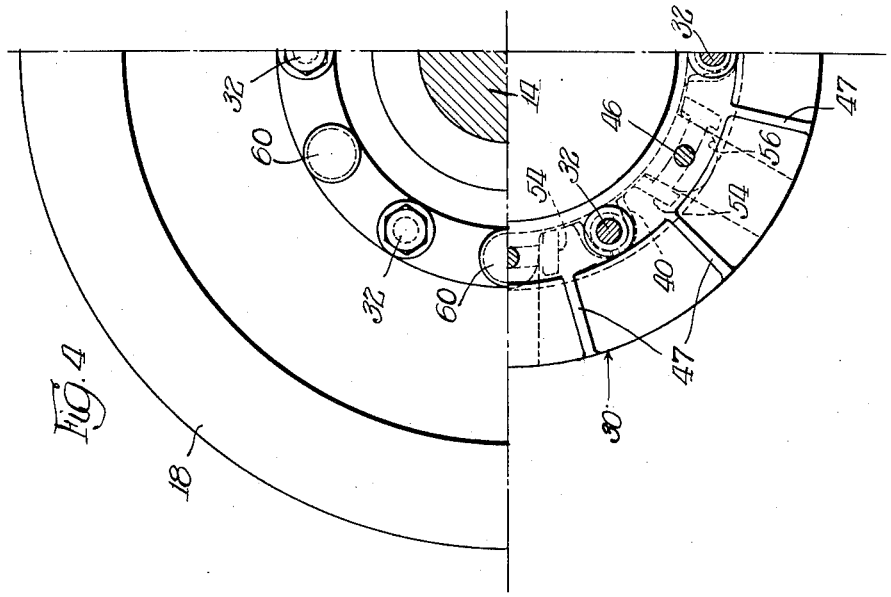
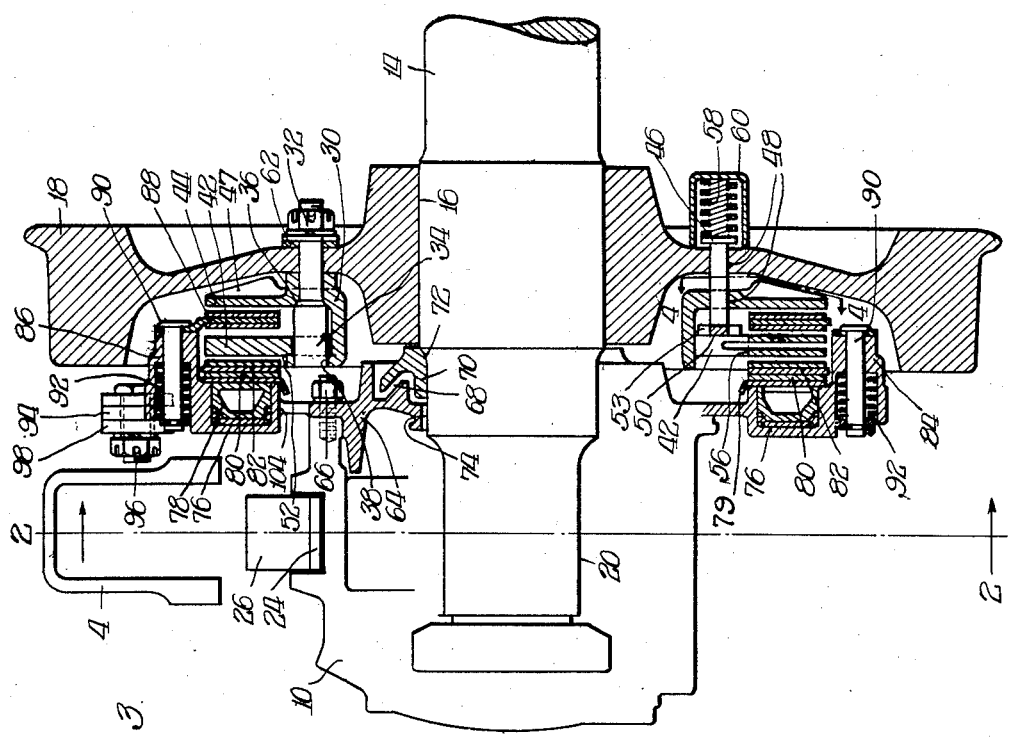

Patented Apr. 28, 1942

2,280,781

UNITED STATES PATENT OFFICE 2,280,781

RAILWAY BRAKE

Walter H. Baselt, Chicago, Ill., assignor to American Steel Foundries, Chicago, Ill., a corporation of New Jersey Application September 8, 1939, Serial No. 293,915

36 Claims. (Cl. 188—153)

My invention relates to brake rigging for railway car trucks, and more particularly to a form of brake mechanism wherein interleaved discs, sometimes designated rotors or stators, are used as a braking medium in distinction from the more common type of brakes wherein brake shoes are applied to the peripheries or rolling surfaces of the wheels.

In my co-pending application, Serial No. 293,914, filed in the United States Patent Office of even date herewith, I have described certain details which are also herein set forth, and reference is hereby made to said co-pending application for further description of said details.

An object of my present invention is to design a practical arrangement, such as that described in my said co-pending application, which will be suitable for application to a railway car truck wherein the wheel and axle assembly comprises a single axle instead of a plurality of axles as described in said co-pending application. My present invention comprehends such an arrangement wherein braking means is afforded for a wheel and axle assembly of roller bearing type in which the roller bearings are mounted between the projecting journal end of the wheel and a member associated with the truck frame usually in the form of a roller bearing journal box.

A different object of my invention is such an arrangement wherein operating means may be integrally formed with the journal box capable of actuating the interleaved rotors and stators for application of brakes as required. My invention also contemplates a modification wherein the power means or brake cylinder may be of ring type integrally formed with a casting formed operably with the journal box by serving as an inside cover therefor.

Yet another object of my invention is such a form of disc brake which will be suitable for application to railway cars in conjunction with brakes of more common shoe type wherein brake heads and brake shoes are applied at one or both sides of the tread surface of the wheel. Yet another object is to so arrange such a disc brake as to permit the rotors to be mounted on each wheel and operated independently of the brakes associated with other wheels, and further wherein the braking means associated with wheels at opposite ends of the given wheel and axle assembly may be independently operated.

Figure 1 is a fragmentary top plan view of a railway car truck embodying my invention, only one-half of the car truck being shown as the application of the brake rigging is similar at opposite sides of the truck.

Figure 2 is an enlarged fragmentary elevation view, partly in section, the view being taken from the left as seen in Figure 3 and the section substantially as indicated by the line 2—2 of Figure 3.

Figure 3 is a sectional view taken transversely through the truck and bisecting the wheel and axle assembly and the brake rigging associated therewith, the section being taken substantially in the planes indicated by the line 3—3 of Figure 2.

Figure 4 is a view partly in elevation and partly in section, the elevation being taken from the right as seen in Figure 3, and the section substantially in the planes indicated by the line 4—4 of Figure 3.

Figures 5 and 6 are sectional views taken through the lugs serving as support means for the stators, said sections being taken substantially in the planes indicated respectively by the lines 5—5 and 6—6 of Figure 2.

Describing my novel structure in greater detail, as shown in the embodiment illustrated herewith, the truck frame 2 comprises the side member 4 and the spaced transverse members or transoms 6 and 8 serving as the usual means of support for an intervening bolster (not shown). Adjacent opposite ends of the side frame 4 may be formed pedestal jaws (not shown) or any conventional means of connection for the journal boxes 10, 10 which are associated with the journal ends of the wheel and axle assemblies 12, 12.

Each wheel and axle assembly comprises an axle 14 upon each end of which may be press-fitted as at 16 a wheel 18 normally rotating therewith. The axle 14 projects beyond the wheel 18 in the usual manner to form the journal end portion 20 upon which may be mounted in any convenient manner antifriction bearings received within the journal box 10. The type and arrangement of said bearings constitute no part of my invention, and any type of single or two course antifriction bearings may be used such as are well-known in the art. The top of the journal box 10 is afforded a seat as at 24 for the equalizer 26 upon which may be supported the truck frame through the medium of springs (not shown) positioned upon said equalizer and affording a means of support for the superposed side member 4 in a manner well-known in the art. At opposite sides of the journal box 10 may be secured wear plates 28, 28 (Figure 2) affording the usual means of bearing against the before-mentioned pedestal jaws of the side frames 4.

Mounted upon each wheel on the outboard face thereof is the ring casting 30 which may be secured thereto by means of the spaced studs or bolts 32, 32, said bolts having elongated heads 34 of the form more particularly described in my said co-pending application, each of said heads being afforded a tapered portion indicated at 36 forming seating means for the bolt in the complementary opening of the casting 30. Each bolt head 34 is projected to engage as at 38 an aligned opening formed in the lug or ear 40 at the extremity of said head, as best seen in the sectional view of Figure 3. The heads of the bolts 32 serve as carriers for the outboard rotors 42, and the inboard rotor 44 is integrally formed with the ring casting 30. The inboard rotor 44 has a series of ribs 47, 47 serving as fans to accelerate the movement of air, acting as a cooling medium for the device when in operation. Alternately positioned with respect to the bolts 32 are the release plungers 46, 46 projecting through aligned openings in the plate of the wheel and the ring casting 30 as best seen at 48, 48 (Figure 3) to have abutment as at 50 with the outboard rotor 42 to maintain said rotor 42 in its normal released position in engagement with the lugs 40 as best seen at 52 (Figure 3). Each of the plungers 46 is afforded a special I-shaped head 53 shown in elevation at 54, 54 in the sectional view of Figure 4, said head forming a means of spanning the slots 56, 56 formed in the rotor 42 and equally spaced therein with the lugs 40 which are formed on the ring casting 30. By this arrangement the rotor 42 may be slightly rotated and thus removed off the ring casting 30 without the removal of the casting itself. In such an operation, the casting 30 would be maintained in position by replacing some of the securing bolts 32 with the flat head bolts which would not project beyond the rotor 44, as described in greater detail in my said co-pending application. Each of the plungers 46 is maintained in its normal position in abutment with the rotor 42 by means of a release spring 58 housed within the casing 60 which may be formed as an integral part of the spacer ring 62.

As illustrated, the journal box 10 has the inside cover plate 64 secured to said journal box by a series of stud bolts 66, 66, said cover plate forming as at 68 a labyrinthine passage of annular form in conjunction with the sleeve 70 which may be press-fitted upon the axle 14 against the shoulder 72. The cover plate 64 is afforded clearance from the axle 14 as at 74 (Figure 3), and said cover plate may be integrally formed with the journal box 10, thus dispensing with the securing stud 66, 66 if desired. In such case, the journal box would be formed with a suitable opening on the outboard face thereof.

Integrally formed with the cover plate 64 or with the journal box 10, if said cover plate is made integral with said box, is the power means or cylinder 76 of ring type, and operable therein is the ring type piston 78, having on its inboard face the washer members 79 affording a seat as at 80 for the stator 82. The stator 82 is carried on a series of studs 84, 84 (Figure 6), said studs being alternately arranged with the studs 86, 86 (Figure 5) which serve as support means for the inboard stator 88. Each stud 84 and 86 houses a plunger 90 and release spring 92 (Figure 3), said release springs being operable to maintain the stators in their released position when the brakes are inoperative as described in greater detail in my said co-pending application, Serial No. 293,914. Each of the stators 82 and 88 is of a general form more particularly described in a co-pending application, Serial No. 296,218, filed in the United States Patent Office September 23, 1939, in the name of Carl E. Tack, and comprises a central plate or carrier with friction plates secured on opposite faces thereof.

Integrally formed with the cover plate 64 is the lug 94 forming a means of pivotal connection as at 96 to the torque arm 98, the opposite end of which may have pivotal connection as at 100 to the bracket 102, integrally formed on the side frame 4, adjacent its juncture with each transom member as best seen in the top plan view of Figure 1.

In operation, actuation of the power means or brake cylinder 76 causes the piston 78 to move inboard, thus moving the stator 82 axially into engagement with the rotor 42 and successively axially moving the said rotor 42 and the stator 88 until all of said rotors and stators are brought tightly into engagement against the inboard rotor 44 which serves as stop means. Application of the power may control the pressure with which said rotors and stators are urged into engagement with each other, thus developing the required amount of frictional absorption and affording retardation as desired. When the brakes are released, the release springs 58, 58 operate to restore the rotor 42 to its normal released position, and the release springs 92, 92 operate to restore to their respective normal positions the inboard stator 88 and the outboard stator 82.

When the wheels are in rotation, the fans or ribs 47 on the ring casting 30 operate to drive air radially outwardly, thus operating to cool the device, and passage for said cooling air is afforded through the slots 56, 56 in the rotor 42, and through a series of openings formed in the cover plate 64 radially inward of the ring cylinder 76, as best seen at 104 (Figure 3).

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car, a frame, a supporting wheel and axle having a journal and a journal box therefor, an inboard cover plate for said box, braking means comprising a plurality of rotors mounted on said wheel, a plurality of stators supported from said plate, means on said plate operable to move said rotors and stators axially into a compact pile for frictional engagement with each other, said operating means comprising a ring cylinder integrally formed with said plate and a ring piston operable in said cylinder to compress said rotors and stators into frictional engagement, and independently operable release means for each of said stators.

2. In a railway truck, a frame, a supporting wheel and axle, a journal box having an inboard cover plate, braking means comprising interleaved rotors and stators supported respectively from said wheel and said plate, operating means in the form of a ring cylinder integrally formed on said plate for moving said stators and rotors into operative engagement, and a plurality of support and release means about the periphery of said plate for each of said stators.

3. In a vehicle having a rotating wheel and axle with a journal end, and a frame member supporting a journal box for said journal end, interleaved stationary and rotating members supported for frictional engagement with each other, means on said wheel for driving said rotating members, said journal box having an inboard plate with a plurality of support and reerable and alternately mounted about the periphery of said cylinder.

16. In a railway car truck, a frame, a supporting wheel and axle having a journal and a journal box having an inboard cover plate with a peripheral flange, a ring cylinder integrally formed around said flange, braking means comprising rotors secured to said wheel and stators supported from said flange, a ring piston for operating said rotors and stators, independently operative release means for said rotors and stators, and a torque connection between said frame and the outer periphery of said flange.

17. In a railway car truck, a frame, a supporting wheel and axle, a journal box having an inboard cover plate with a radial flange, a ring cylinder integrally formed about the perimeter of said flange, interleaved rotors and stators supported respectively on said wheel and said flange, means for axially moving said rotors and stators into a compact pile for a frictional engagement, means on one of said rotors operable to cause centrifugal movement of a cooling medium, and a torque connection between the outer periphery of said cylinder and said frame.

18. In a railway car truck, a frame, a supporting wheel and axle having a journal and a journal box with an inboard cover plate having a radial flange, a ring cylinder integrally formed about the periphery of said flange, braking means comprising rotors secured to said wheel and stators supported from said flange, a ring piston in said cylinder for operating said rotors and stators, and release means for certain of said rotors, said release means comprising resilient means mounted on the inboard face of said wheel and plungers therethrough.

19. In a railway truck, a frame, a supporting wheel and axle, a journal box having an inboard cover plate with a radial flange, a ring cylinder integrally formed about the periphery of said flange, braking means comprising interleaved rotors and stators supported respectively from said wheel and said flange, a ring piston in said cylinder operable to move said stators and rotors into operative engagement, and a torque connection between said frame and the outer perimeter of said cylinder.

20. In a railway truck, a frame, a supporting wheel and axle, a journal box having an inboard cover plate with a radial flange, a ring cylinder integrally formed about the periphery of said flange, braking means comprising interleaved rotors and stators supported respectively from said wheel and said flange, a ring piston operable to actuate said brakes, and release means mounted inboard of said wheel for certain of said rotors.

21. In a railway car truck, a frame, a supporting wheel and axle having a journal and a journal box having an inboard radial flange, a ring cylinder integrally formed about the periphery of said flange, braking means comprising rotors secured to said wheel and stators supported from said flange, a ring piston in said cylinder operable to move said rotors and stators into a pile for frictional engagement, and a torque arm connected between said frame and the outer periphery of said cylinder.

22. In a railway truck, a frame, a supporting wheel and axle, a journal box having an inboard peripheral flange, a ring cylinder integrally formed about the periphery of said flange, braking means comprising interleaved rotors and stators supported respectively from said wheel and said flange, a ring piston operable to actuate said braking means, and a torque arm connected between said frame and the outer periphery of said cylinder.

23. In a railway truck, a frame, spaced supporting wheel and axle assemblies having journal ends, journal boxes mounted in said frame for said journal ends, each of said journal boxes having an inboard wall with a radial flange, a ring cylinder integrally formed about the perimeter of said flange, braking means for each wheel comprising interleaved rotors and stators supported respectively from the wheel and the adjacent journal box flange, a ring piston in each cylinder operable to actuate the adjacent braking means, and a torque connection between said frame and the outer periphery of each of said flanges.

24. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, and rotors and stators supported respectively from said wheel and said flange in normal spaced relationship with one of said stators seated against said piston, said piston being operable to move said rotors and stators into a compact pile for frictional engagement.

25. In a railway truck, a frame having pedestal jaws, a wheel and axle assembly having a journal end, a journal box supported in said jaws for said journal end, said journal box having an inboard wall with a radial flange, a ring cylinder on said flange, a ring piston in said cylinder, rotors and stators supported respectively from said wheel and said flange in normal spaced relationship with one of said stators seated against said piston, said piston being operable to move said rotors and stators into a compact pile for frictional engagement, and a torque arm connected between said frame and the outer periphery of said flange.

26. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, rotors and stators supported respectively from said wheel and said flange in normal spaced relationship with one of said stators seated against said piston, said piston being operable to move said rotors and stators into a compact pile for frictional engagement, and spaced lugs alternately formed about the perimeter of said flange affording independent support means for said stators.

27. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, rotors and stators supported respectively from said wheel and said flange in normal spaced relationship with one of said stators seated against said piston, said piston being operable to move said rotors and stators into a compact pile for frictional engagement, spaced lugs alternately formed about the perimeter of said flange aflease means arranged about its periphery for each of said stationary members, and a torque arm connected between said frame and a peripheral point on said plate.

4. In a railway car truck, a frame, a supporting wheel and axle having a journal and a journal box, braking means between said frame and said wheel comprising rotors secured to said wheel and stators supported from said box, means on said box for operating said rotors and stators, said operating means being in the form of a ring cylinder integrally formed with said box and operable to compress said rotors and stators into a compact mass for frictional engagement with each other, and independent support and release means for each of said stators alternately arranged around said box.

5. In a railway car, a frame, a supporting wheel and axle having a journal and a journal box therefor, braking means between said wheel and said journal box comprising a plurality of rotors mounted on said wheel, a plurality of stators supported from said journal box, means on said box comprising a ring cylinder integrally formed therewith operable to move said rotors and stators axially into a compact pile for frictional engagement with each other, independently operative release means for each of said stators, and a torque arm connected between said frame and a point on said box adjacent the periphery thereof.

6. In a railway truck, a frame, a supporting wheel and axle, a journal box, braking means between said frame and said wheel comprising interleaved rotors and stators supported respectively from said wheel and said box, integral means on said box for bringing said stators and rotors into operative engagement, release means operable to move said rotors and stators out of engagement, said release means being independently operable for each of said stators and certain of said rotors, and a torque arm connected between a peripheral point on said box and said frame.

7. In a railway car, a frame, a supporting wheel and axle having a journal and a journal box therefor, braking means between said wheel and said journal box comprising a plurality of rotors mounted on said wheel, a plurality of stators supported from said journal box, means on said box operable to move said rotors and stators axially into a compact pile for frictional engagement with each other, and release means for each of said stators, said operable means on said box comprising a ring cylinder integrally formed therewith and a torque connection between said frame and the outer periphery of said cylinder.

8. In a railway truck, a frame, a supporting wheel and axle, a journal box, braking means comprising interleaved rotors and stators supported respectively from said wheel and said box, means on said box operable to actuate said brakes, release means for said brakes, said release means being independently operable for each of said stators and certain of said rotors, said operable means comprising a ring cylinder integrally formed with a part of said box, and a torque connection between said frame and the outer periphery of said cylinder.

9. In a railway car, a frame, a supporting wheel and axle having a journal and a journal box therefor, said box having an inboard cover plate, braking means comprising a plurality of rotors mounted on said wheel, a plurality of stators supported from said journal box, means on said plate operable to move said rotors and stators axially into a compact pile for frictional engagement with each other, said operable means comprising a ring cylinder, and a torque connection between the outer periphery of said cylinder and said frame.

10. In a railway car, a frame, a supporting wheel and axle having a journal and a journal box therefor, said box having an inboard cover plate, braking means comprising a plurality of rotors mounted on said wheel, a plurality of stators supported from said plate, means on said plate operable to move said rotors and stators axially into a compact pile for frictional engagement with each other, release means for said rotors and stators, said operable means comprising a ring cylinder integrally formed with said plate, and a torque connection between the outer periphery of said cylinder and said frame.

11. In a railway truck, a frame, a supporting wheel and axle, a journal box having an inboard cover plate, braking means comprising interleaved rotors and stators supported respectively from said wheel and said plate, means integrally formed with said plate for bringing said stators and rotors into operative engagement, said means comprising a ring cylinder, a ring piston normally seated against one of said stators, and a torque arm connected between the outer periphery of said cylinder and said frame.

12. In a railway truck, a frame, a supporting wheel and axle, a journal box, braking means comprising interleaved rotors and stators supported respectively from said wheel and said box, means on said box operable to actuate said brakes, release means for said brakes, said release means being independently operable for each of said stators, said operable means comprising a ring cylinder integrally formed with a part of said box and peripherally arranged with respect thereto, and a torque arm connected between said frame and the radially outermost portion of said cylinder.

13. In a railway truck, a frame, a supporting wheel and axle, a journal box having an inboard cover plate having a radially extending flange, a ring cylinder integrally formed with said flange, braking means comprising interleaved rotors and stators supported respectively from said wheel and said flange, a ring piston in said cylinder operable to actuate said brakes, and a torque arm connected between the outer periphery of said flange and said frame.

14. In a railway truck, a frame, a supporting wheel and axle, a journal box having an inboard cover plate with a radial flange, a ring cylinder integrally formed with said flange, braking means comprising interleaved rotors and stators supported respectively from said wheel and said flange, a ring piston in said cylinder operable to move said stators and rotors into operative engagement, and release means operable to move said rotors and stators out of engagement, said release means for said stators being alternately mounted about the periphery of said flange.

15. In a railway car truck, a frame, a supporting wheel and axle having a journal and a journal box with an inboard cover plate having a ring cylinder integrally formed about the periphery thereof, braking means comprising rotors secured to said wheel and stators supported from said plate, a ring piston in said cylinder for operating said rotors and stators, and release means for each of said stators independently opfording independent support means for said stators, and release means in each of said lugs for returning the associated stator to normal position after operation.

28. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, rotors and stators supported respectively from said wheel and said flange in normal spaced relationship with one of said stators seated against said piston, said piston being operable to move said rotors and stators into a compact pile for frictional engagement, and release means inboard of said wheel for certain of said rotors.

29. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, rotors and stators supported respectively from said wheel and said flange in normal spaced relationship with one of said stators seated against said piston, said piston being operable to move said rotors and stators into a compact pile for frictional engagement, and release means mounted inboard of said wheel for certain of said rotors and mounted on said flange for said stators.

30. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, rotors and stators supported respectively from said wheel and said flange in normal spaced relationship with one of said stators seated against said piston, said piston being operable to move said rotors and stators into a compact pile for frictional engagement, and independent release means alternately mounted about the periphery of said flange for the respective stators.

31. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, rotors and stators supported respectively from said wheel and said flange in normal spaced relationship with one of said stators seated against said piston, said piston being operable to move said rotors and stators into a compact pile for frictional engagement, release means inboard of said wheel for certain of said rotors, and a torque connection between said frame and the outer periphery of said cylinder.

32. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, rotors and stators supported respectively from said wheel and said flange in normal spaced relationship with one of said stators seated against said piston, said piston being operable to move said rotors and stators into a compact pile for frictional engagement, release means mounted inboard of said wheel for certain of said rotors and mounted on said flange for said stators, and a torque connection between said frame and the outer periphery of said cylinder.

33. In a railway truck, a frame having pedestal jaws, a wheel and axle assembly having a journal end, a journal box supported in said jaws for said journal end, said journal box having an inboard wall with a radial flange, a ring cylinder integrally formed about the periphery of said flange, a ring piston in said cylinder, rotors and stators supported respectively from said wheel and said flange in normal spaced relationship with one of said stators seated against said piston, said piston being operable to move said rotors and stators into a compact pile for frictional engagement, independent release means alternately mounted about the periphery of said flange for the respective stators, and a torque connection between said frame and the outer periphery of said cylinder.

34. In a railway car truck, a frame, a supporting wheel and axle assembly having a journal end, a journal box having an inboard wall with a radial flange, a ring cylinder integrally formed about the periphery of said flange, rotors and stators interleaved between said cylinder and said wheel and supported respectively from said wheel and said flange, said stator support means comprising a series of lugs alternately formed about the periphery of said flange for the respective stators, and release means for said stators mounted in said lugs.

35. In a railway car truck, a frame, a supporting wheel and axle assembly having a journal end, a journal box having an inboard wall with a radial flange, a ring cylinder integrally formed about the periphery of said flange, rotors and stators interleaved betwen said cylinder and said wheel and supported respectively from said wheel and said flange, said stator support means comprising a series of lugs alternately formed about the periphery of said flange for the respective stators, and release means for certain of said rotors mounted on said wheel and comprising resilient means inboard said wheel and plungers extending therethrough.

36. In a railway car truck, a frame, a supporting wheel and axle assembly having a journal end, a journal box having an inboard wall with a radial flange, a ring cylinder integrally formed about the periphery of said flange, rotors and stators interleaved between said cylinder and said wheel and supported respectively from said wheel and said flange, said stator support means comprising a series of lugs alternately formed about the periphery of said flange for the respective stators, release means for certain of said rotors mounted inboard said wheel, and release means for said stators alternately mounted about the periphery of said flange and connected respectively to the peripheries of said stators.

WALTER H. BASELT.